United States Patent

Cakmaz et al.

[11] Patent Number: 5,209,261
[45] Date of Patent: May 11, 1993

[54] SLIDE VALVE

[75] Inventors: Aydogan Cakmaz; Jürgen Class, both of Stuttgart, Fed. Rep. of Germany

[73] Assignee: Mercedes-Benz AG, Fed. Rep. of Germany

[21] Appl. No.: 908,999

[22] Filed: Jul. 6, 1992

[30] Foreign Application Priority Data

Jul. 12, 1991 [DE] Fed. Rep. of Germany ....... 4123036

[51] Int. Cl.⁵ ............................................. F15B 13/02
[52] U.S. Cl. ................................. 137/596.17; 91/451; 91/459; 137/596.2
[58] Field of Search ................................ 91/451, 459; 137/596.17, 596.2

[56] References Cited

U.S. PATENT DOCUMENTS

| 5,115,721 | 5/1992 | Ichihashi et al. | 137/596.17 X |
| 5,115,722 | 5/1992 | Ichihashi et al. | 137/596.17 X |
| 5,144,881 | 9/1992 | Cakmaz | 137/596.17 X |

FOREIGN PATENT DOCUMENTS

2413440C2  9/1985  Fed. Rep. of Germany .
3811669   10/1988  Fed. Rep. of Germany .
3938417    3/1991  Fed. Rep. of Germany .
2240159    7/1991  United Kingdom .

Primary Examiner—Gerald A. Michalsky
Attorney, Agent, or Firm—Evenson, McKeown, Edwards & Lenahan

[57] ABSTRACT

A slide valve, having a pump port, a reservoir port and at least one consumer port is described, which comprises a slide which is spring-loaded into a first position and can be moved into a second position counter to the spring force by means of an adjusting assembly. At least one of the consumer ports is connected to the reservoir port in the first slide position and to the pump port in the second slide position. Arranged between the adjusting assembly and the slide is a seat-controlled safety valve which, in the closed position, shuts off the adjacent open end of a longitudinal duct formed in the slide which, on the one hand, is connected to the consumer port and, on the other hand, to the reservoir port via the opened safety valve when the slide is possibly blocked and not loaded by the adjusting assembly. The longitudinal duct is closed off at the other end by an additional pressure relief valve which limits the pressure in the longitudinal duct with the safety valve usually being closed.

19 Claims, 3 Drawing Sheets

SLIDE VALVE

BACKGROUND AND SUMMARY OF THE INVENTION

The invention relates to a slide valve having a pressure or pump port, a reservoir port, at least one consumer port, a slide which is loaded by a spring force in the direction of a first position and can be moved into a second position counter to the spring force by means of an adjusting assembly, and via which one of the consumer ports can be connected to the reservoir port in the first slide position and to the pump port in the second slide position. A seat-controlled safety valve is arranged between the adjusting assembly and the slide, is loaded in the closing direction by the slide loaded by the spring force and, in the closed position, shuts off the adjacent open end of a longitudinal duct formed in the slide, which longitudinal duct is constantly connected, on the one hand, to the consumer port and, on the other hand, to the reservoir port via the opened safety valve when the slide is possibly blocked and not loaded by the adjusting assembly.

A corresponding slide valve having a single consumer port is the subject-matter of the German patent document DE 3,811,669 A1 and can serve for connecting a consumer, which is usually non-pressurized or connected to the reservoir, to the pressure source or pump in particular cases. For this purpose, the slide is moved into its second position counter to the spring force by means of the adjusting assembly. The subsequent return of the valve into its starting position, in which the relevant consumer is uncoupled from the delivery side of the pump again and connected to the reservoir again, can be effected via the return spring assigned to the slide. Due to the safety valve, the consumer is guaranteed to be uncoupled from the pressure source or pump even if the slide is blocked in the second position in the case of a malfunction possibly occurring, in particular as a result of contamination. Accordingly, pressure relief of the consumer is possible in any case as soon as the adjusting assembly departs from its position assigned to the second position of the slide.

A slide valve is known from German patent document DE 2,413,440 C2 which serves for controlling a double-action consumer and, for this purpose, in a first position connects a first port of this consumer to a pressure source or pump and connects a second port of this consumer to a pressureless reservoir or the like while, in a second position, the second port of the consumer is connected to the pressure source pump and the first port of the consumer is connected to the reservoir or the like. Furthermore, a neutral position can be set, in which both consumer ports are closed off, but are connected to one another by a pressure relief valve arrangement if a pressure difference of a given size between the consumer ports is exceeded. This pressure relief valve arrangement is arranged in a longitudinal duct of the slide.

In motor vehicles, in particular, it can be desirable to be able to use a pressure source or pump, which usually serves for supplying a main consumer, temporarily for operating a further consumer.

In this case, it should be guaranteed that this further consumer can, on the one hand, be loaded only by a limited pressure and, on the other hand, be reliably uncoupled from the pressure source or pump under all circumstances - with simultaneous connection to the pressureless reservoir or the like.

This object is achieved according to the invention by a slide valve of the type mentioned above in that a further consumer port is connected to the pressure port in the first slide position and is separated therefrom in the second slide position, in that the longitudinal duct constantly communicates via a radial bore in the slide with that consumer port which is connected to the pressure port in the second slide position, in that the longitudinal duct of the slide which is closed off at one end by the safety valve is closed off at the other end by an additional pressure relief valve which limits the pressure in the longitudinal duct with the safety valve usually being closed, and in that the outlet orifice of the pressure relief valve communicates with the reservoir port in all positions of the slide.

Due to this construction, the pressure in the longitudinal duct of the slide and thus the pressure at the consumer port constantly connected to the longitudinal duct is always limited to a predeterminable value, the pressure limiting being effected without moving the slide and thus without displacing the control edges of the slide. Accordingly, the response of the pressure relief valve cannot have any influence whatsoever on the pressure ratios at the other consumer which is not connected to the longitudinal duct of the slide.

Due to the pressure relief valve integrated in the slide, an extremely compact construction is achieved, a particular advantage being that the preferably central longitudinal duct of the slide which is already present in any case on the delivery side of the safety valve is also used at the same time for providing the connection paths required for limiting the pressure. Due to the arrangement of the pressure relief valve at the end of the slide facing away from the safety valve and the adjusting assembly, the lead path connecting the outlet orifice of the pressure relief valve to the reservoir can also be used for discharging leaking fluid flowing to this end of the slide.

Especially preferred embodiments wherein the longitudinal duct extends at least essentially up to the end of the slide facing away from the safety valve, and wherein the additional pressure relief valve is arranged in this end region have the particular advantage that the pressure relief valve is arranged outside the control edge region of the valve and the valve slide can thus be designed in this region virtually independently of the pressure relief valve and the otherwise customary slide paths, for example, can thus also be retained.

According to certain preferred embodiments, the longitudinal duct formed in the slide additionally also serves in a particularly advantageous manner for guiding the slide-type closing body of the pressure relief valve accommodated in this duct. The spring system of the closing body can be adjusted in respect of its spring force.

In certain preferred embodiments, the outlet orifice which an be shut off by the pressure relief valve opens out into a collecting space which can also serve, in particular, for discharging leaking fluid occurring during operation. The return spring system, which may be a compression spring, for example, loading the slide into its first position is also expediently arranged in this collecting space.

Due to the particularly advantageous design variant according to certain preferred embodiments, switchover can take place selectively by corresponding movement of the valve slide between two consumer ports which are alternately connected to the pump or uncoupled from the delivery side of the pump in each case. For this purpose, consumers of different types may be provided. In accordance therewith, at least one of the consumers can be constantly connected to the reservoir via a return so that separate pressure limiting is not required for this consumer in contrast to a consumer connected and supplied with pressure only on one side.

According to other preferred embodiments, two different consumers are preferably to be supplied alternately by a single pump. Accordingly, the pump port can be connected selectively via the consumer ports, for example, to a level control or a differential lock assigned to a drive axle of the relevant vehicle.

If the differential lock is to be supplied with pressure only in special cases and the level control is usually to be connected to the pump, the slide valve is expediently designed wherein the consumer port, which is connected to the pump port in the first slide position, can be connected to the level control and the consumer port, which is connected to the pump port in the second slide position, can be connected to the differential lock.

Other objects, advantages and novel features of the present invention will become apparent from the following detailed description of the invention when considered in conjunction with the accompanying drawings.

DETAILED DESCRIPTION OF THE DRAWINGS

Figure 1:
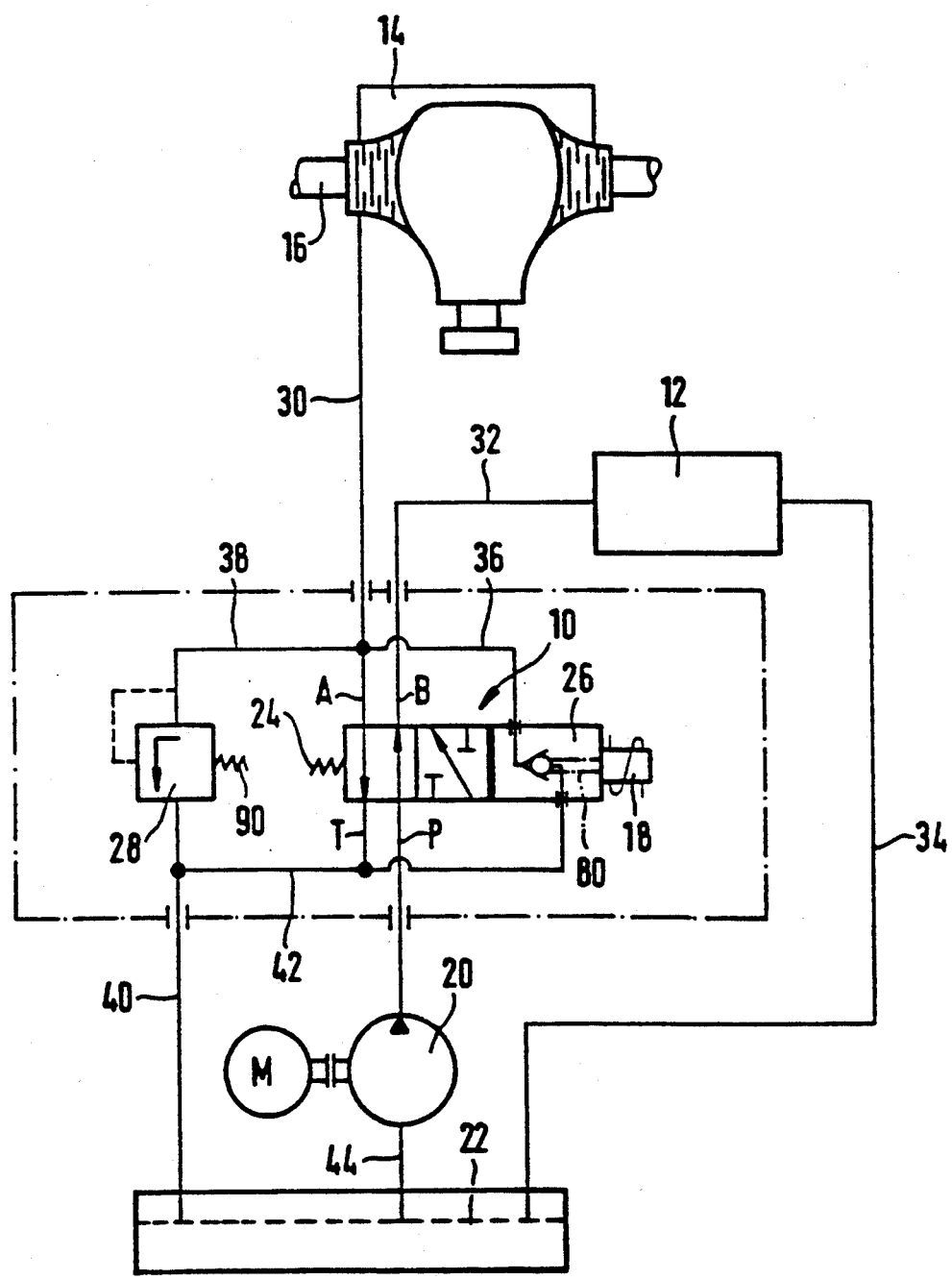
FIG. 1 shows a diagrammatic circuit diagram of a hydraulic system, whose pump can be connected selectively to a level control or a differential lock of a motor vehicle, constructed according to a preferred embodiment of the invention.

The hydraulic system illustrated in FIG. 1 comprises a 4/2-way slide valve 10 having two consumer ports A, B, a pump port P and a reservoir port T, whose pump port P can be selectively connected to two different consumers, namely to a level control 12 or a differential lock 14 on a drive axle 16 of a vehicle.

The slide valve 10 can be moved by means of an electromagnet 18, serving as adjusting assembly, from the illustrated first position, in which the level control 12 is connected to the delivery side of a pump 20 and the differential lock 14 is connected to a reservoir 22, counter to the force of a return spring system, in particular a return spring 24, into its second position, in which the differential lock 14 is connected to the delivery side of the pump 20 and the ports T and B leading to the reservoir 22 or to the level control 12 are shut off.

Only compression forces can be transmitted to the slide of the slide valve 10 via the electromagnet 18 or its armature so that the return of the slide from the second position into the illustrated first position is brought about solely by the return spring 24 after the electromagnet 18 has been switched off or switched over.

Arranged between the slide of the slide valve 10 and the electromagnet 18 is a seat-controlled safety valve 26 which is loaded in the closing direction by the spring-loaded slide.

Apart from the safety valve 26, the slide valve 10 additionally comprises a pressure relief valve 28 arranged between the consumer port A and the reservoir 22.

The consumer port A of the 4/2-way slide valve 10 is connected via a pressure line 30 to the differential lock 14 and the consumer port B is connected via a pressure line 32 to the level control 12 which is connected to the reservoir 22 via a return 34.

The seat of the safety valve 26, constructed in the present exemplary embodiment as a ball valve, is provided at one end of a line section 36 assigned to the slide of the slide valve 10, which line section is connected at the other end to the consumer port A and thus to the pressure line 30, leading to the differential lock 14, and to a line section 38 leading to the pressure relief valve 28.

The pressure relief valve 28 is connected to the reservoir 22 via a line section 40, with which the reservoir port T of the slide valve 10 is connected, in turn, via a line section 42. Via the same line section 42 and the safety valve 26, a connection between the consumer port A and the reservoir 22 is made, in particular also in the second slide position (not illustrated), for example when the slide is blocked, as soon as the closing body of the safety valve 26 is released by the electromagnet 18. In this case, the consumer port A which is usually connected to the pump port P in this second slide position is connected to the reservoir 22 via the line section 36, the opened safety valve 26, the line section 42 and the line section 40 and is thus relieved from pressure.

The pump 20 is connected to the reservoir 22 via a line section 44 on the suction side.

Figure 2:
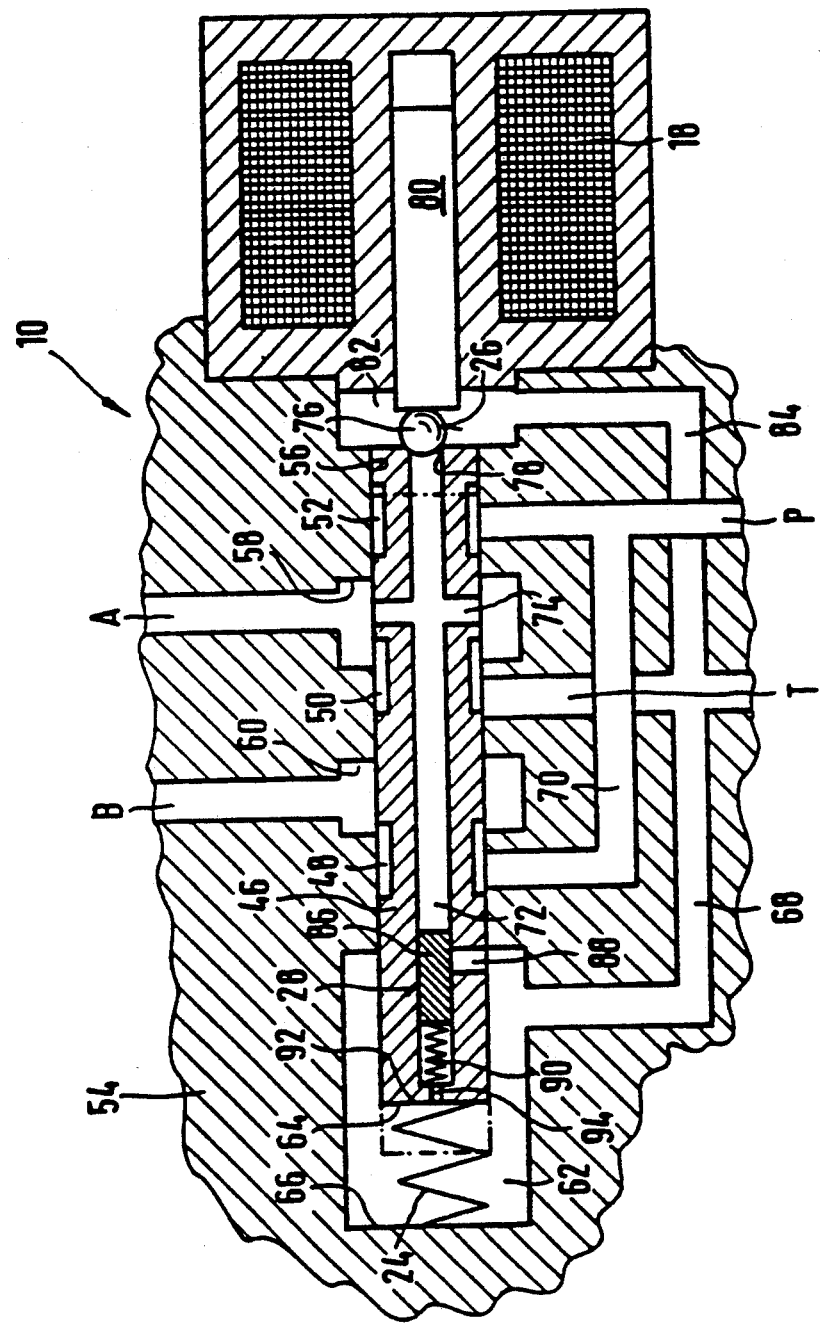
FIG. 2 shows a diagrammatic sectional illustration of a design variant of the slide valve used in the hydraulic system according to FIG. 1.

The parts and line sections located inside the dot-/dashed border in FIG. 1 are expediently constituents, integrated in the slide valve 10, of a 4/2-way slide valve, such as is also the case, for example, in the design variant of the slide valve 10 shown in FIG. 2.

According to FIG. 2, this advantageous design variant of the 4/2-way slide valve 10 comprises a slide 46, on whose outside circumference three annular grooves 48, 50, 52 are formed and which is guided in a bore 56 of the slide valve housing 54. Provided in the wall of the slide valve housing 54 bounding the bore 56 are two annular grooves 58, 60 which are connected to the consumer port A or the consumer port B and interact with the annular grooves 48, 50, 52 of the slide 46. Apart from the two consumer ports A, B, the slide valve 10 comprises, in turn, a pump port P and a reservoir port T.

The slide 46 enters with its end facing away from the electromagnet 18 into a collecting space 62 connected to the reservoir port T via a duct section 68.

The slide 46 is loaded by the compression spring 24 into the first position shown in FIG. 2 (cf. also FIG. 1). This compression spring 24 is supported, on the one hand, on the end face 64 of the slide 46 located in the collecting space 62 and, on the other hand, on a wall 66 of the slide valve housing 54 bounding the collecting space 62.

The pump port P opens out, on the one hand, into the annular groove 52 and, on the other hand, via a duct section 70 into the annular groove 48.

Formed in the slide 46 is a central longitudinal duct 72 which is connected to the annular groove 58 assigned to the consumer port A via a plurality of radial bores 74 provided in the slide 46. The radial bores 74 always open out into this annular groove 58 regardless of the respective position of the slide.

Arranged between the electromagnet 18 or its armature 80 and the slide 46 loaded by the compression spring 24 is the seat-controlled safety valve 26 whose closing body 76 shuts off the adjacent open end of the longitudinal duct 72 formed in the slide 46 in the closed position illustrated. The closing body 76, which is spherical in the present case, has a somewhat larger diameter than the central longitudinal duct 72 so that the mouth of the longitudinal duct 72 provided in the right end face of the slide 46 simultaneously forms the seat 78 for this closing body 76 of the safety valve 26.

The central longitudinal duct 72 opens out with its end 78, which is usually closed by the safety valve 26, into a space 82 on the magnet side which, in turn, is connected to the reservoir port T via a duct portion 84 of the 4/2-way slide valve 10.

The longitudinal duct 72 of the slide 46 which is closed off at one end by the safety valve 26 is closed off at the other end by the additional pressure relief valve 28 which limits the pressure in the longitudinal duct 72 with the safety valve 26 usually being closed.

The longitudinal duct 72 opening out into the space 82 on the magnet side extends essentially over the entire length of the slide 46 and is bounded at the end opposite the safety valve 26 or the electromagnet 18 by the bottom 92 of the slide 46, in which an axial bore 94 of smaller cross section leading to the collecting space 62 is provided.

The additional pressure relief valve 28 is arranged inside the longitudinal duct 72 in the region of the bottom wall 92 and comprises a slide-type closing body 86 which is guided in the longitudinal duct 72, is spring-loaded into its closed position and can be moved into its open position counter to the spring force of a return spring system, in the present case a compression spring 90, by a correspondingly high pressure in the longitudinal duct 72, in which position it exposes a radial bore 88 of the slide 46 opening out into the collecting space 62. The return spring system or compression spring 90 assigned to the additional pressure relief valve 28 is supported, on the one hand, on the bottom 92 of the slide 46 and, on the other hand, on the slide-type closing body 86.

The radial bore 88 always opens out into the collecting space 62 connected to the reservoir port T regardless of the respective slide position.

The 4/2-way slide valve 10 shown in FIG. 2 is accordingly designed in such a way that the two consumer ports A, B can be selectively connected to the pump port P via the electromagnetically actuated slide 46. In the first slide position shown both in FIG. 1 and in FIG. 2, the consumer port A is connected to the reservoir port T via the annular groove 58 and the annular groove 50, while the consumer port B is connected to the pump port P via the annular groove 60, the annular groove 48 and the duct section 70. In this first slide position, the consumer port A is indeed connected to the longitudinal duct 72 via the axial bores 74. However, pressure limiting by the additional pressure relief valve 28 provided in this longitudinal duct is not required in this slide position since the port A is connected to the reservoir in any case.

In the second slide position indicated by dot/dashed lines, the consumer port A is connected to the pump port P via the annular groove 58 and the annular groove 52 and, in turn, to the central longitudinal duct 72 via the radial bores 74. In this second slide position, the consumer port B is shut off just like the reservoir port T.

Figure 3:
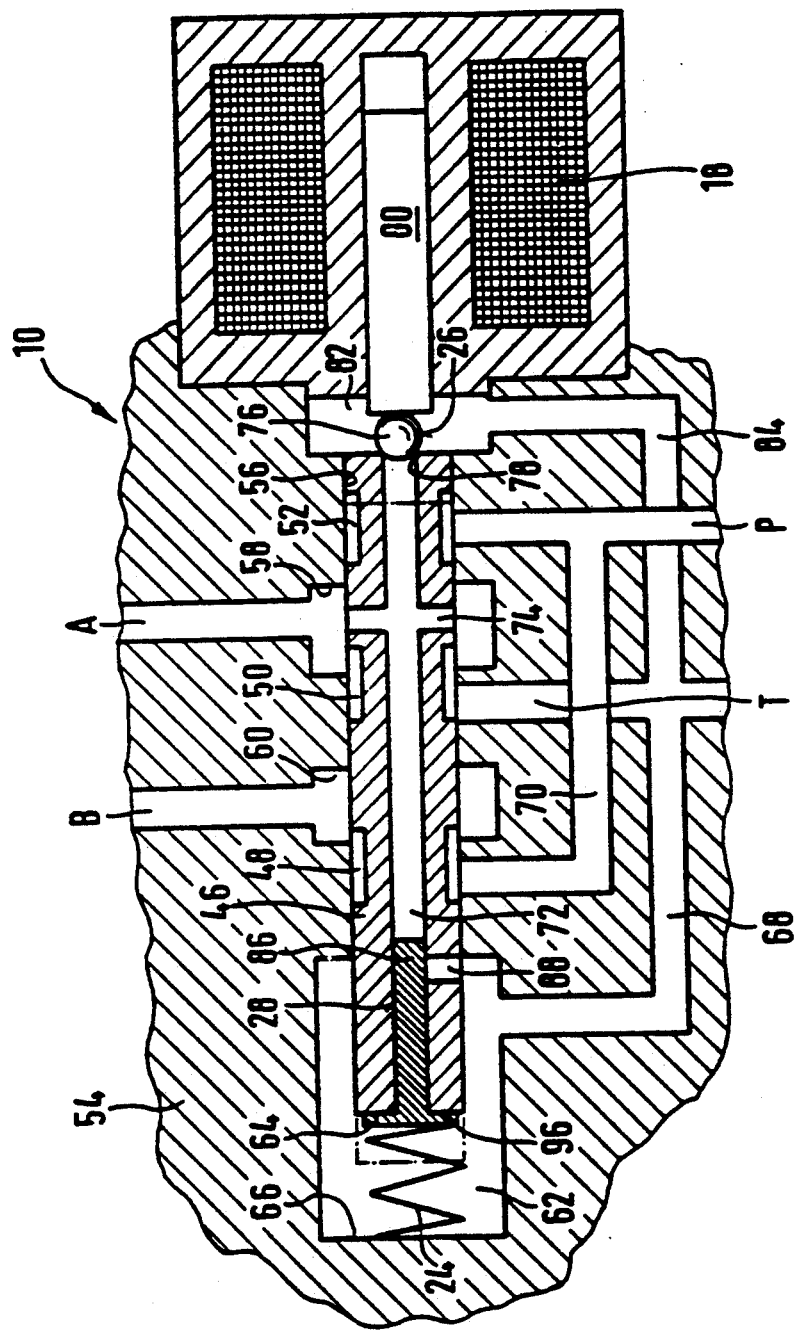
FIG. 3 shows a diagrammatic sectional illustration of a further design variant of the slide valve.

The design variant of the slide valve shown in FIG. 3 differs from the embodiment according to FIG. 2 merely by the fact that, in the latter case, the pressure relief valve 28 comprises a flange 96 which is connected to the closing body 86, is arranged outside the longitudinal duct 72 and is held by the compression spring 24 against the end face 64 of the slide 46.

The slide 46 and the closing body 86 are thus loaded by one and the same compression spring 24, this spring 24 urging the slide 46 into the first position shown in FIG. 3 via the flange 96 of the pressure relief valve 28.

The mode of functioning of the slide valve according to the invention is described below:

When the electromagnet 18 has no current, the slide 46 of the 4/2-way slide valve 10 is held by the compression spring 24 in the first slide position shown in FIGS. 1 to 3. In this first slide position, the consumer port A connected to the differential lock 14 communicates with the reservoir port T leading to the reservoir 22. On the opposite side, the level control 12 5 is connected to the pump 20 driven by the motor M (cf. FIG. 1) via the consumer port B and the pump port P. In this case, no pressure limiting takes place by the pressure relief valve 28 since the differential 14 is in any case connected to the tank or reservoir 22 and the level control 12 connected to the reservoir 22 via the return 34 does not communicate with the longitudinal duct 72.

When the slide 46 assumes its second position indicated by dot/dashed lines in FIGS. 2 and 3 after corresponding actuation of the magnet 18, the differential lock 14 is connected to the pump 20 via the consumer port A and the pump port P, while both the reservoir port T and the consumer port B connected to the level control 12 are each shut off.

To lock the axle 16, which may be the rear axle, for example, the multi-plate clutches of the differential lock 14 are thus loaded directly by the hydraulic pump 20. When the desired pressure level has been reached, the pump flow flows off via the pressure relief valve 28. In the present case, limiting thus takes place of the pressure in the central longitudinal duct 72 and thus also of the pressure at the consumer port A leading to the differential lock 14. In the case of the design variant according to FIG. 2, the spring 90 is expediently constructed to be weaker than the spring 24. If the differential lock 14 assigned to the axle 16 is to open, the magnet 18 is switched off again, as a result of which the slide 46 can, in turn, be returned by the compression spring 24 into the first position, in which the pump flow is used for the other consumer, in the present case the level control 12.

Should the slide 46 become blocked when the magnet 18 is switched back, the safety valve 26, which is now released by the armature 80 of the electromagnet 18, opens, as a result of which, in this case too, the differential lock 14 is connected to the reservoir 22 or uncoupled from the delivery side of the pump 20.

Instead of using the pump flow for a further consumer 12 when the valve slide is returned to the first position, the pump flow can also be fed without pressure back to the tank or reservoir 22 in this first slide position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Slide valve comprising:
   a pressure or pump port,
   a reservoir port,
   at least one consumer port,
   a slide,
   a spring for loading the slide toward a first slide position,
   an adjusting assembly for selectively moving the slide into a second slide position counter to the spring force,
   wherein one of the consumer ports is connected to the reservoir port in the first slide position and to the pump port in the second slide position,
   and a seat-controlled safety valve which is arranged between the adjusting assembly and the slide, said safety valve being loaded in its closing direction by the slide loaded by the spring force, said safety valve shutting off an adjacent open end of a longitudinal duct formed in the slide when in a safety valve closed position,
   wherein the longitudinal duct is constantly connected, on the one hand, to the one consumer port and, on the other hand, to the reservoir port via the opened safety valve when the slide is possibly blocked and not loaded by the adjusting assembly,
   wherein a further consumer port is connected to the pressure or pump port in the first slide position and is separated therefrom in the second slide position, wherein the longitudinal duct constantly communicates via a radial bore in the slide with that consumer port which is connected to the pressure or pump port in the second slide position,
   wherein the longitudinal duct of the slide which is closed off at one end by the safety valve is closed off at the other end by an additional pressure relief valve which limits the pressure in the longitudinal duct with the safety valve usually being closed, and
   wherein the outlet orifice of the pressure relief valve communicates with the reservoir port in all positions of the slide.

2. Slide valve according to claim 1, wherein the longitudinal duct extends at least essentially up to the end of the slide facing away from the safety valve, and wherein the additional pressure relief valve is arranged in this end region.

3. Slide valve according to claim 1, wherein the additional pressure relief valve is arranged inside the longitudinal duct of the slide.

4. Slide valve according to claim 1, wherein the additional pressure relief valve comprises a slide-type closing body which is guided in the longitudinal duct, is spring-loaded into its closed position, and can be moved into its open position counter to the spring force by a correspondingly high pressure in the longitudinal duct, in which position it exposes at least one outlet orifice of the slide, which outlet orifice is connected, in particular, to the reservoir port and opens out into the longitudinal duct.

5. Slide valve according to claim 4, wherein the closing body of the pressure relief valve is loaded into the closed position by a compression spring arranged between said additional pressure relief valve and the bottom of the longitudinal duct facing away from the safety valve.

6. Slide valve according to claim 5, wherein the pressure relief valve comprises a flange which is connected to the closing body, is arranged outside the longitudinal duct, and is held resiliently against the relevant end face of the slide.

7. Slide valve according to claim 6, wherein the slide is spring-loaded into the first position via the flange of the additional pressure relief valve.

8. Slide valve according to claim 4, wherein the outlet orifice is formed by a radial bore in the wall of the slide bounding the longitudinal duct.

9. Slide valve according to claim 4, wherein the outlet orifice of the slide, which is usually shut off by the additional pressure relief valve, opens out into a collecting space which surrounds the relevant slide end and is connected to one of the reservoir port and the reservoir.

10. Slide valve according to claim 9, wherein the slide is loaded into the first position by a compression spring, and wherein this compression spring is supported, on the one hand, on the end face of the slide located in the collecting space and, on the other hand, on a wall of the slide valve housing bounding the collecting space.

11. Slide valve according to claim 10, wherein the compression spring is supported on the relevant end face of the slide via the flange of the pressure relief valve.

12. Slide valve according to claim 1, wherein, in the case of at least two consumer ports which can be connected selectively to the pump port via the slide, the consumer port connected to the pump port in the first slide position and the reservoir port are blocked in each case by the slide having been moved into its second position.

13. Slide valve according to claim 1, wherein the consumer port, which is connected to the pump port in the first slide position and is blocked in the second slide position, can be connected to a consumer which is constantly connected to the reservoir via a return.

14. Slide valve according to claim 1, wherein the consumer port which is connected to the pump port in the second position, can be connected to a consumer without fluid circulation.

15. Slide valve according to claim 1, wherein the pump port can be connected selectively via the consumer ports to a level control or a differential lock assigned to a drive axle of a relevant vehicle.

16. Slide valve according to claim 15, wherein the consumer port, which is connected to the pump port in the first slide position, can be connected to the level control and the consumer port, which is connected to the pump port in the second slide position, can be connected to the differential lock.

17. Slide valve according to claim 1, wherein it is constructed as a 4/2-way valve having two consumer ports which can be connected selectively to the pump port.

18. Slide valve according to claim 1, wherein the adjusting assembly comprises an electromagnet.

19. Slide valve according to claim 18, wherein a closing body of the safety valve can be loaded via an armature of the electromagnet.

* * * * *